(No Model.)
C. W. GREIST.
SAW.
No. 352,867. Patented Nov. 16, 1886.
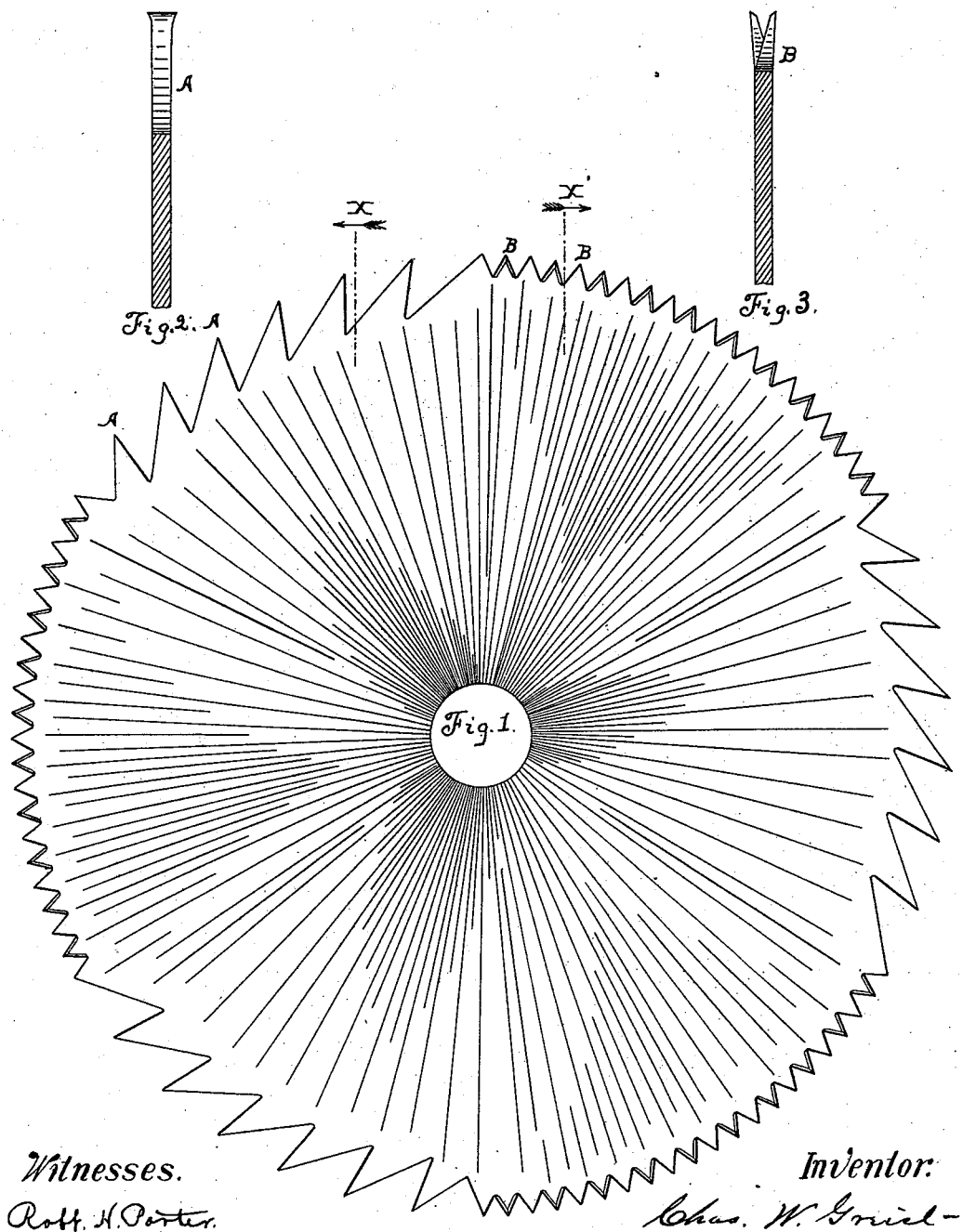

United States Patent Office.

CHARLES W. GREIST, OF ERIE, PENNSYLVANIA.

SAW.

SPECIFICATION forming part of Letters Patent No. 352,867, dated November 16, 1886.

Application filed June 14, 1886. Serial No. 205,111. (No model.)

*To all whom it may concern:*

Be it known that I, CHARLES W. GREIST, a citizen of the United States, residing at Erie, in the county of Erie and State of Pennsylvania, have invented certain new and useful Improvements in Saws; and I do hereby declare the following to be a full, clear, and exact description of the invention, such as will enable others skilled in the art to which it appertains to make and use the same.

This invention relates to saws; and it consists in improvements in the construction thereof, as will be hereinafter fully set forth and claimed.

My invention is illustrated in the accompanying drawings, as follows: Fig. 1 is a side elevation of a circular saw made in accordance with my invention. Fig. 2 is a front view of one of the saw-teeth A, looking from the dotted line $x$ in Fig. 1 in the direction of the arrow. Fig. 3 is a like view of the teeth B, looking from the line $x'$ in Fig. 1 in the direction of the arrow thereon.

It will be seen in Fig. 1 that there two kinds of teeth—namely, long deep teeth A, and short shallow teeth B—and that these teeth are arranged in groups. The teeth A are set and filed in the manner that the teeth of a rip saw are set and filed, and the teeth B are set and filed in the manner that the teeth of a crosscut-saw are set and filed. It will therefore be seen that the saw is composed of alternate groups of rip-saw teeth and crosscut-saw teeth, and that while these teeth are of different lengths and depths they have their points in the same circumferential plane. It is not essential that the groups occupy equal spaces, for the groups containing large teeth may have only two or three teeth in them, and it is not essential in all cases that the large teeth be set and filed as rip-saw teeth.

A saw constructed in accordance with my invention possesses the following advantages: When made as shown in Fig. 1, it can be used equally well as a rip-saw and as a crosscut-saw. It will make a much smoother cut than a rip-saw or a crosscut-saw having even much finer teeth. It will do smooth work with much less power. It clears itself of sawdust much better, and therefore there is much less friction to overcome. It will cut much faster than an ordinary saw of either kind having the same sized teeth. Part of the teeth being deeper than the others, the periphery of the saw-plate is broken into sections, and can expand when heated by running without warping or dishing the saw. It therefore follows that a thinner saw-plate can be used, and large saw-plates may be run faster; and, further, the saw-plate being thinner, the saw-kerf will be narrower, and hence a saving in lumber will occur.

I am aware that saws have been made having groups of teeth of varying lengths and uniform depths, as in the patent to Andrews, No. 156,748, November 10, 1874; but such a construction in no way contemplates my invention.

What I claim as new is—

1. A saw having long deep teeth A, finished as rip-saw teeth, and short shallower teeth B, finished as crosscut-saw teeth, said teeth being arranged in alternating groups, substantially as set forth.

2. A circular saw having groups of teeth intercepted by teeth of greater depth, thereby breaking the periphery into sections, substantially as and for the purposes set forth.

In testimony whereof I affix my signature in presence of two witnesses.

CHARLES W. GREIST.

Witnesses:
C. F. DOWNING,
WM. SCHAAF.